(12) United States Patent
Bassaco

(10) Patent No.: US 10,151,412 B2
(45) Date of Patent: Dec. 11, 2018

(54) HYDRAULIC LINE CONNECTOR

(71) Applicant: Perfection Clutch, Charleston, SC (US)

(72) Inventor: Arnaldo R. Bassaco, Mount Pleasant, SC (US)

(73) Assignee: Perfection Hy-Test Company, Charleston, SC (US)

(*) Notice: Subject to any disclaimer, the term of this patent is extended or adjusted under 35 U.S.C. 154(b) by 340 days.

(21) Appl. No.: 15/001,754

(22) Filed: Jan. 20, 2016

(65) Prior Publication Data

US 2016/0131291 A1  May 12, 2016

Related U.S. Application Data

(62) Division of application No. 12/924,194, filed on Sep. 22, 2010, now Pat. No. 9,273,812.

(60) Provisional application No. 61/245,520, filed on Sep. 24, 2009.

(51) Int. Cl.

| F16L 37/088 | (2006.01) |
| F16L 37/34  | (2006.01) |
| F16D 25/12  | (2006.01) |
| B23P 11/00  | (2006.01) |
| B23P 19/00  | (2006.01) |
| B23P 19/04  | (2006.01) |
| F16L 37/08  | (2006.01) |
| F16D 25/08  | (2006.01) |

(52) U.S. Cl.
CPC ............. *F16L 37/08* (2013.01); *F16D 25/08* (2013.01); *F16D 25/12* (2013.01); *F16L 37/088* (2013.01); *F16L 37/34* (2013.01); *Y10T 29/49947* (2015.01)

(58) Field of Classification Search
CPC ......... B23P 19/00; B23P 19/04; B23P 11/005; F16C 11/12; F16L 37/08; F16L 37/34; F16L 37/088; F16D 25/12; F16D 25/08; Y10T 29/49947; Y10T 29/4984; Y10T 29/49844; Y10T 29/4987; Y10T 29/49826
USPC ....... 29/428, 434, 436, 450, 525.01; 285/23, 285/319, 321
See application file for complete search history.

(56) References Cited

U.S. PATENT DOCUMENTS

| 3,450,424 A | 6/1969  | Calisher |
| 3,584,902 A | 6/1971  | Vyse |
| 3,628,768 A | 12/1971 | Hutt |
| 3,929,357 A | 12/1975 | DeVincent et al. |
| 4,423,891 A | 1/1984  | Menges |

(Continued)

*Primary Examiner* — Sarang Afzali
*Assistant Examiner* — Darrell C Ford
(74) *Attorney, Agent, or Firm* — Andrus Intellectual Property Law, LLP

(57) ABSTRACT

A method of fastening a male member of a hydraulic line connector to a female member of the hydraulic line connector. The a female member has a cylindrical wall portion defining a bore having a frusto-conical surface, and an opposing pair of slits. A spring clip is provided that has a first leg featuring a first arcuate portion, a second leg featuring a second arcuate portion, and a closed end portion removably positioned between and attached to the first and second legs. The male member has a shoulder, a reduced portion, and a frusto-conical surface that tapers inward from the shoulder. The male member can be positioned in the bore of the female member so that the shoulder is engaged by the first and second arcuate portions of the first and second legs of the spring clip.

7 Claims, 4 Drawing Sheets

(56) References Cited

U.S. PATENT DOCUMENTS

| | | | | |
|---|---|---|---|---|
| 4,423,892 | A | 1/1984 | Bartholomew | |
| 4,725,081 | A | 2/1988 | Bauer | |
| 4,884,829 | A | 12/1989 | Funk et al. | |
| 4,991,627 | A | 2/1991 | Nix | |
| 5,070,844 | A | 12/1991 | Daly | |
| 5,248,168 | A * | 9/1993 | Chichester | F16L 27/1021 285/232 |
| 5,366,259 | A | 11/1994 | Hohmann et al. | |
| 5,586,792 | A | 12/1996 | Kalahasthy et al. | |
| 5,704,100 | A | 1/1998 | Swan | |
| 5,716,081 | A * | 2/1998 | Leigh-Monstevens | F16L 37/088 137/614.03 |
| 6,155,612 | A | 12/2000 | Szabo | |
| 6,179,345 | B1 | 1/2001 | Gensert et al. | |
| 6,604,760 | B2 | 8/2003 | Cresswell et al. | |
| 6,688,654 | B2 | 2/2004 | Romero | |
| 6,908,119 | B2 | 6/2005 | Murken | |
| 6,955,512 | B2 | 10/2005 | Allen et al. | |
| 6,983,958 | B2 * | 1/2006 | Rautureau | F16L 37/088 285/305 |
| 6,997,486 | B2 | 2/2006 | Milhas | |
| 7,201,403 | B2 * | 4/2007 | Takayanagi | F16L 37/088 285/305 |
| 7,278,693 | B2 | 10/2007 | Smith et al. | |
| 7,328,922 | B2 | 2/2008 | Takayanagi et al. | |
| 7,338,092 | B1 * | 3/2008 | Cicconi, III | F16L 37/144 285/1 |
| 7,530,605 | B2 * | 5/2009 | Rigollet | F16L 37/088 285/305 |
| 7,533,908 | B2 * | 5/2009 | Vogel | F16L 21/08 285/314 |
| 7,631,904 | B2 | 12/2009 | Heim et al. | |
| 8,146,956 | B2 | 4/2012 | Chaupin | |
| 8,348,582 | B2 | 1/2013 | Bithell et al. | |
| 9,004,543 | B2 | 4/2015 | Bongiomi et al. | |
| 9,273,812 | B2 | 3/2016 | Bassaco | |
| 2003/0001386 | A1 * | 1/2003 | Cresswell | F16L 37/088 285/305 |
| 2003/0090109 | A1 | 5/2003 | Ostrander et al. | |
| 2003/0137148 | A1 | 7/2003 | Andre et al. | |
| 2004/0061332 | A1 | 4/2004 | Takayanagi et al. | |
| 2005/0236833 | A1 | 10/2005 | Poirier et al. | |
| 2006/0049630 | A1 * | 3/2006 | Bilstein | F16L 37/1225 285/321 |
| 2006/0103134 | A1 | 5/2006 | Kerin | |
| 2006/0214420 | A1 * | 9/2006 | Mori | F16L 37/088 285/319 |
| 2011/0241341 | A1 | 10/2011 | Bauer et al. | |
| 2012/0025523 | A1 | 2/2012 | Zhu et al. | |

* cited by examiner

HYDRAULIC LINE CONNECTOR

CLAIM OF PRIORITY

This application is a divisional of U.S. Non-provisional application 12/924,194, filed Sep. 22, 2010, now U.S. Pat. No. 9,273,812, and claims priority from U.S. Provisional Patent Application Ser. No. 61/245,520, filed Sep. 24, 2009, the entirety of which are incorporated herein by reference.

FIELD OF THE INVENTION

The present invention generally relates to hydraulic components and systems and, more particularly, to a connector for hydraulic lines used to connect the master and slave assemblies of a motor vehicle clutch system.

BACKGROUND

A typical motor vehicle hydraulic clutch system, of the type used on automobiles, trucks and buses, is indicated in general at 10 in FIG. 1. As is known in the art, the system includes a slave cylinder 12, a master cylinder 14 and a hydraulic line 16 connecting the two hydraulic components. As illustrated in FIG. 1, the slave cylinder 12 is typically mounted within the clutch bell housing 18. As is known in the art, the clutch bell housing 18 is typically mounted between the vehicle motor and gearbox and the slave cylinder surrounds the vehicle driveshaft.

The master cylinder 14 contains a supply of hydraulic fluid, which may be replenished through port 20. A rod 22 is connected to a piston (not shown) positioned within the master cylinder. The rod 22 also features a linkage 24 that is pivotally connected to a clutch pedal (not shown) that is located within the vehicle driver's compartment. When the vehicle clutch pedal is depressed, hydraulic fluid is driven from the master cylinder 14, due to movement of the internal piston, through hydraulic line 16 to slave cylinder 12. The slave cylinder 12, upon receipt of the hydraulic fluid, releases the clutch to permit the driver to manipulate the vehicle gearbox so as to change gears.

It is often necessary to disconnect the hydraulic line 16 from either the master cylinder 14 or slave cylinder 12 when the clutch system requires servicing or when either component needs to be repaired or replaced. As a result, the hydraulic line 16 is provided with connectors at each end.

An example of a prior art connector may be found in U.S. Pat. No. 4,991,627 to Nix. The Nix '627 patent illustrates a connector featuring a male member and a female member. The male member features an annular shoulder. The female member of the connector features a bore sized to receive the male member. A retainer clip, which is formed from a tube or ring of thin spring steel is positioned within the bore of the female member. The retainer clip is slit to form a number of inwardly-extending fingers which engage the shoulder of the male member when it is inserted into the female member. This secures the male and female connector members together.

While the design of the Nix '627 patent facilitates attachment of the male and female members of the connector together, disconnecting the two members, and thus removal of the hydraulic line from either the master or slave cylinders, is somewhat cumbersome. In addition, a special tool is required to disconnect the male and female members of the connector of the Nix '657 patent. A connector that facilitates both connecting and disconnecting the male and female members is desirable.

DETAILED DESCRIPTION OF EMBODIMENTS

Figure 1:
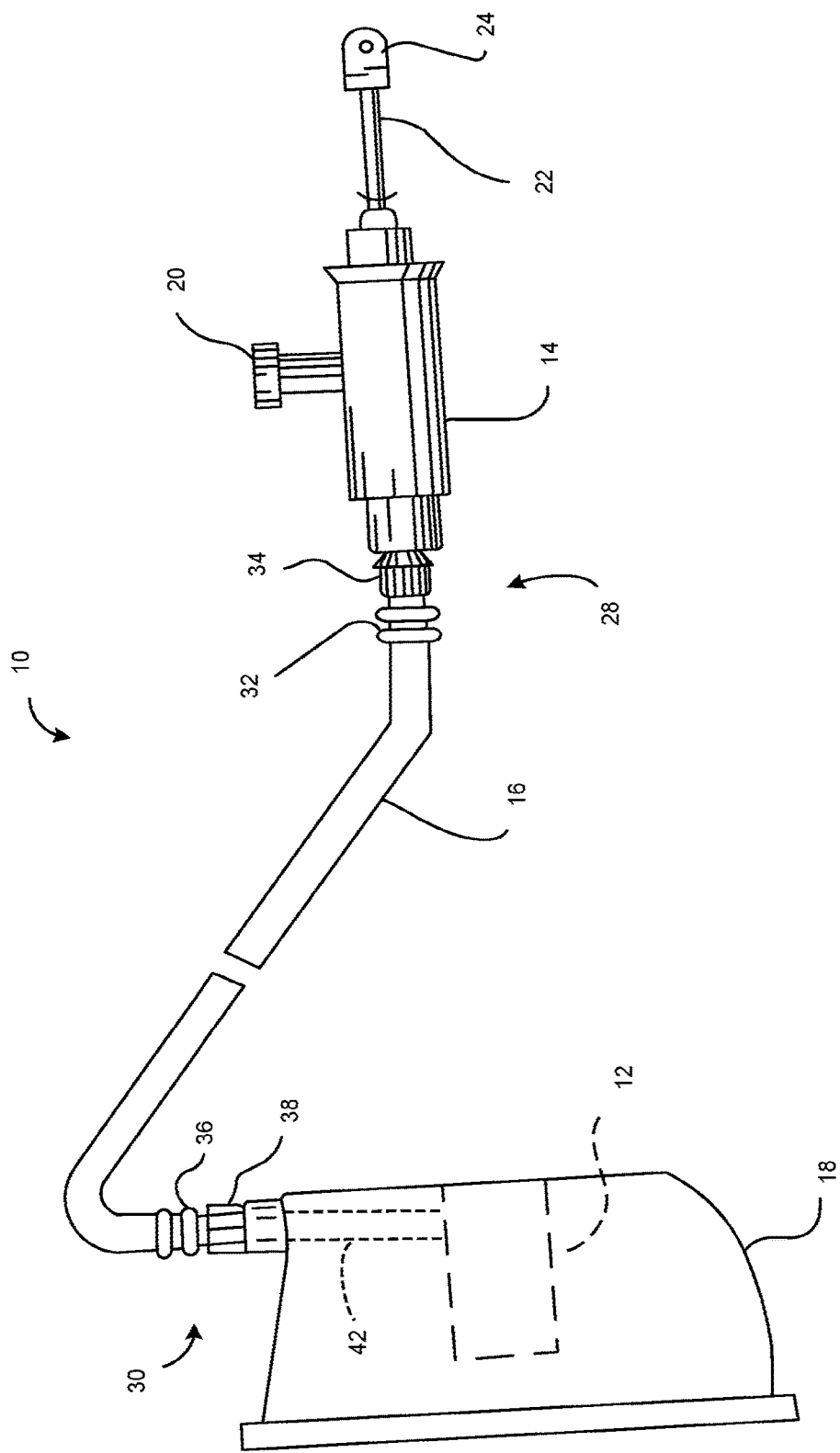
FIG. 1 is a schematic representation of a hydraulic clutch system equipped with hydraulic line connectors constructed in accordance with an embodiment of the present invention.

With reference to FIG. 1, hydraulic line 16 features connectors, indicated in general at 28 and 30, positioned on opposite ends. Connector 28 features a male member 32 that has been inserted into, and is secured within, female member 34. Connector 30 similarly features male member 36 and female member 38 that are likewise secured together. As will be explained in greater detail below, either connector 28 or 30 may be quickly released so that hydraulic line 16 may be quickly and easily removed from hydraulic components such as slave cylinder 12 or master cylinder 14 for service or replacement of either component, or service or replacement of line 16 itself.

Figure 2A:
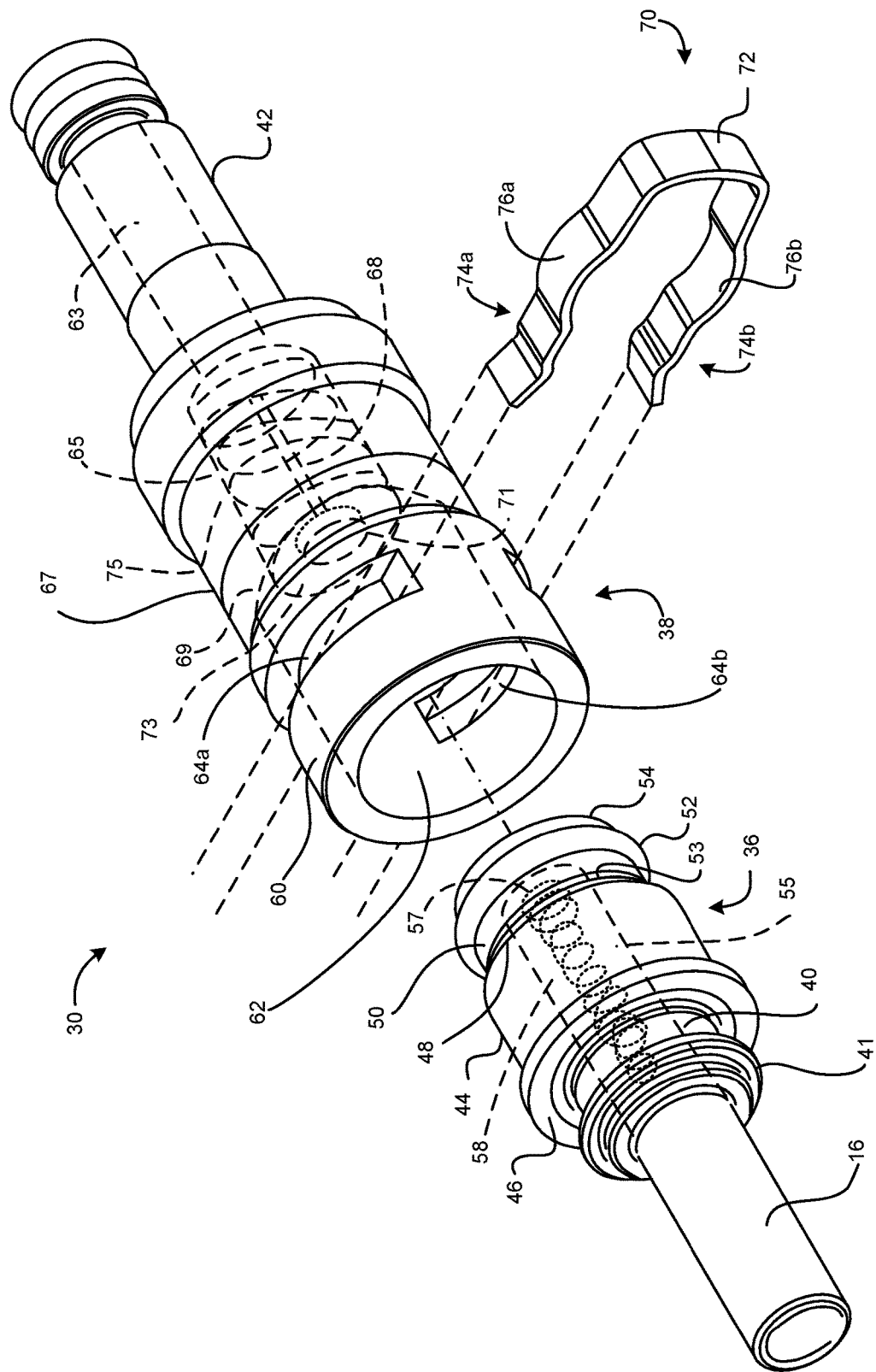
FIG. 2A is perspective view of the connector of the present invention with the male and female members and the spring clip disengaged.

An enlarged, exploded view of connector 30 and a portion of hydraulic line 16 are presented in FIG. 2A. While connector 30 and its components are discussed in greater detail below, it is to be understood that connector 28 features a similar construction, components and operation.

Figure 2B:
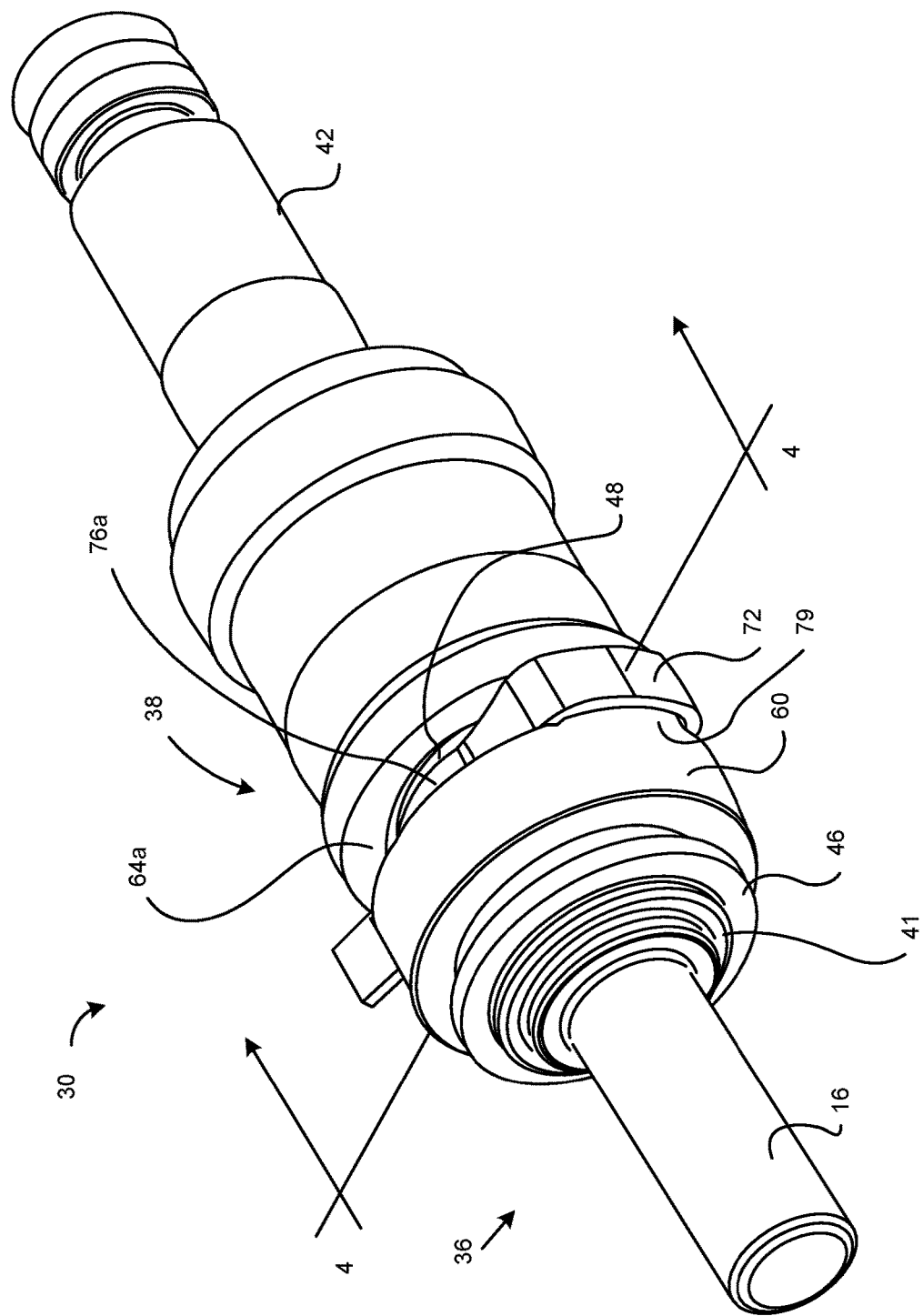
Fig. 2B is a perspective view of the connector of the present invention with the male and female members and the spring clip engaged.

As noted previously, and illustrated in FIGS. 2A and 2B, the connector 30 includes a male member, indicated in general at 36, and a female member, indicated in general at 38. The female member 38 is removably secured to the system slave cylinder (12 in FIG. 1), via attachment portion 42 (FIGS. 1, 2A and 2B). The male member 36 is attached to hydraulic line 16 (see also FIG. 1). Male and female members 36 and 38 are preferably primarily constructed from metal, or any other material that can withstand hydraulic fluids. As is known in the art, hydraulic line 16 may be constructed from rubber or a variety of other flexible materials capable of handling the internal pressure generated by the system master cylinder.

With reference to FIG. 2A, male member 36 includes a sliding surface 40 bordered on one edge by circumferential flange 41. A sliding sleeve 44 is preferably constructed from plastic and features a circumferential collar 46 formed on a trailing edge of the sleeve. A shoulder 48 is formed on the male member and borders the end of the sliding surface 40 opposite flange 41. The sleeve 44 may engage the shoulder 48, as illustrated in FIG. 2A, or the circumferential collar 46 when the male member is not inserted in the female member.

Male member 36 also features a reduced portion, illustrated at 50 in FIG. 2A, upon which is positioned an O-ring 52. O-ring 52 is preferably formed of a rubber or plastic material, or other materials known in the art. The surface of the male member tapers inward from the shoulder 48 so that a frusto-conical surface 53 exists between the shoulder 48 and reduced portion 50. Reduced portion 50 terminates in nose 54. The male member features a passage, illustrated in phantom at 55 in FIG. 2A (and in cross section in FIG. 4), that communicates with hydraulic line 16. With reference to FIG. 2A, passage 55 terminates in an opening in nose 54 that is provided with a cylindrical stopper, illustrated in phantom at 57, that is urged into the closed position illustrated in FIG. 2A by a coil compression spring, illustrated in phantom at 58. Additional details regarding the cylindrical stopper and the coil compression spring may be found in U.S. Pat. No. 4,991,627 to Nix, the contents of which are hereby incorporated by reference.

With reference to FIG. 2A, female member 38 features a cylindrical wall 60 which encloses and defines a bore 62. A pair of opposing slits 64a and 64b are formed through the cylindrical wall 60. An attachment portion passage, illustrated in phantom at 63, is formed through attachment portion 42 and communicates with a body passage, illustrated in phantom at 65, formed within a body portion 67 of the female member. With reference to FIG. 2A, the female member bore 62 also features an inwardly-tapered portion, illustrated in phantom at 69, so that a frusto-conical surface is formed that is sized to engage the O-ring 52 of the male member when the male member is inserted into the female member in the manner illustrated in FIG. 2B. Additional information regarding the frusto-conical surface 69 and functionality with regard to the O-ring 52 may be found in U.S. Pat. No. 4,991,627 to Nix. An opening is formed between the bore 62 and the body passage 65 of the female member. An enlarged head, indicated in phantom at 71, is centrally positioned within the opening in a fixed fashion by a rod, illustrated in phantom at 68. The end of rod 68 opposite the end featuring enlarged head 71 is secured to the body portion 67 of the female member, preferably by a perforated disk positioned, and circumferentially attached, within the body passage 65 (as shown in U.S. Pat. No. 4,991,627 to Nix). The enlarged head is surrounded by an annular abutment surface, illustrated in phantom at 73. The annular abutment surface is urged into the closed position illustrated in FIG. 2A by a compression coil spring, illustrated in phantom at 75. Additional details regarding the enlarged head, rod, annular abutment surface and compression coil spring may be found in U.S. Pat. No. 4,991,627 to Nix.

Figure 3:
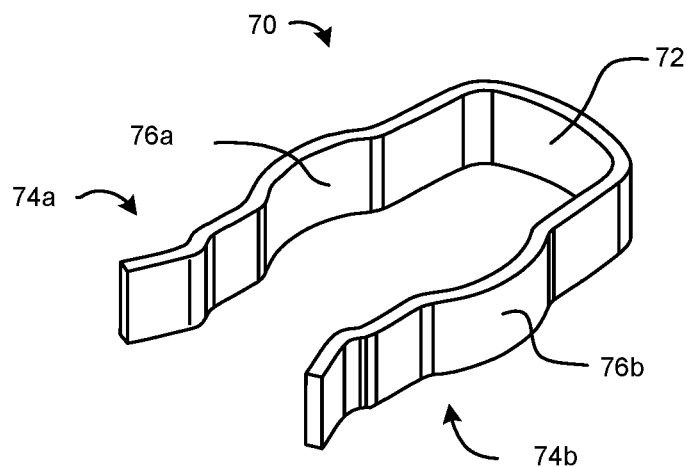
FIG. 3 is a perspective view of the spring clip of FIGS. 2A and 2B.

A spring clip, indicated in general at 70 in FIGS. 2A and 3, features a closed end portion 72 and legs 74a and 74b. Each leg is provided with arcuate portions 76a and 76b. The legs 74a and 74b of the spring clip are inserted into slots 64a and 64b of the female member prior to insertion of the male member 36 into the female member 38 as described below.

Figure 4:
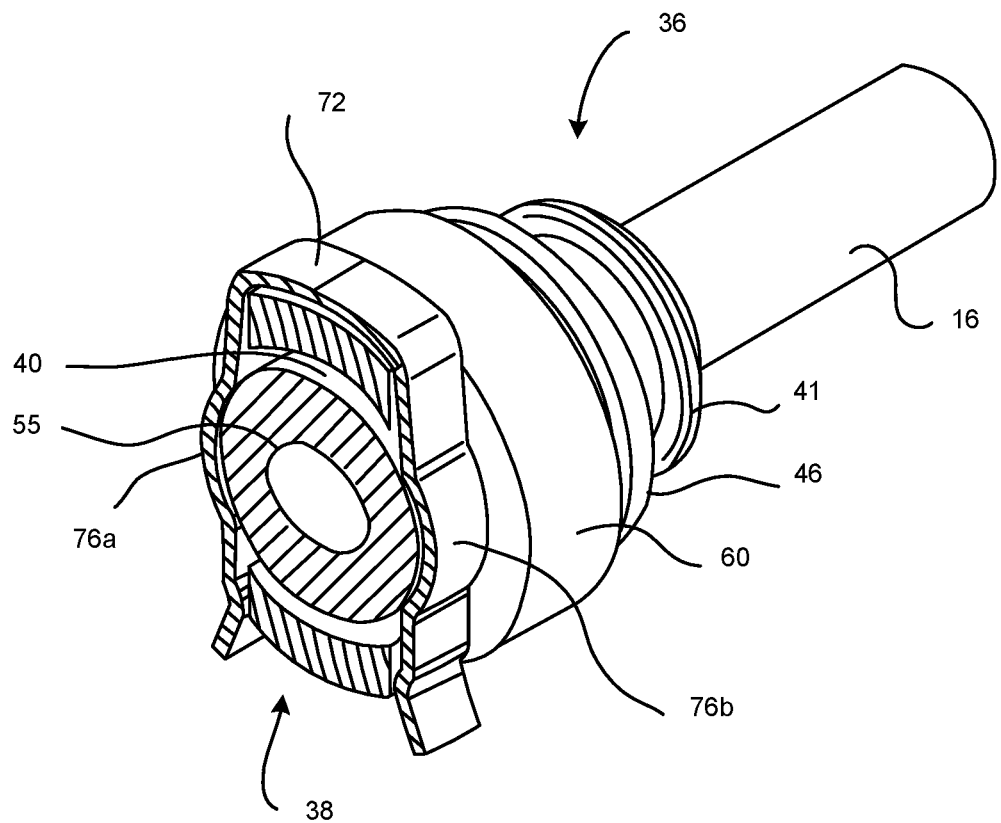
FIG. 4 is a sectional view of the connector of FIG. 2B taken along line 4-4 and rotated counterclockwise 90°.

As illustrated in FIG. 2B, the male member 36 is inserted into the female member 38 of the connector to connect the hydraulic line 16 to the slave cylinder 12 (FIG. 1). During insertion, the sliding sleeve 44 of the male member engages the interior surface of the cylindrical wall 60 of the female member (which defines bore 62) so that the sliding sleeve collar 46 moves towards, and contacts, flange 41, as illustrated in FIG. 2B. With reference to FIGS. 2A and 4, this exposes a portion of the sliding surface 40 of the male member adjacent to shoulder 48. The circumferential flange 41 forces the sliding sleeve to wedge between the male member sliding surface 40 and the interior surface of cylindrical wall 60. The exposed portion of the male member sliding surface is aligned with the opposing slits 64a and 64b of the female member when the male member is inserted therein. In addition, the frusto-conical surface 53 (FIG. 2A) of the male member forces the spring clip legs 74a and 74b slightly apart as the male member is inserted. As a result, as illustrated in FIGS. 2B and 4, the arcuate portions 76a and 76b of the spring clip engage the exposed portion of male member sliding surface 40 when the male member is fully inserted into the female member. The arcuate portions of the spring clip also abut and engage the shoulder 48 (FIGS. 2A and 2B) of the male member so that it is locked within the female member. With reference to FIG. 2B, a gap 79 is formed between the closed end portion 72 of the clip and the exterior surface of the cylindrical wall 60 of the female member. The purpose of this gap is for removal of the clip, as explained below.

When the male member is inserted into the female member as illustrated in FIG. 2B, the enlarged head (71 in FIG. 2A) of the female member engages the cylindrical stopper (57 of FIG. 2A) and pushes the cylindrical stopper inward against the urging of coil spring 58 (FIG. 2A). In addition, the nose 54 (FIG. 2A) of the male member pushes the annular abutment surface (73 of FIG. 2A) inward against the urging of coil spring 75 (FIG. 2A). As a result, and with reference to FIG. 2A, passage 55 of the male member is placed in fluid communication with passages 63 and 65 of the female member. Additional details regarding this functionality may be found in U.S. Pat. No. 4,991,627 to Nix.

As is best illustrated in FIGS. 3 and 4, the end portion 72 and legs 74a and 74b of the spring clip 70 preferably feature a rectangular cross-section. As a result, the interior and exterior surfaces and sides of the spring clip are generally flat which optimizes engagement of the spring clip with the shoulder 48 (FIGS. 2A and 2B) of the male member and the opposing slits of the female member. In addition, such a construction permits the spring clip to be simply manufactured from strips of spring steel that are cut and formed into the appropriate shape. It should be understood, however, that spring clips having alternative profiles may be used, especially if a corresponding groove is present in the male member.

When it is desired to separate the male and female members, a tool such as an appropriately-sized flat blade screw driver or pliers may be used to remove spring clip 70 from the slots of the female member, and thus out of engagement with the surface portion 40 and the shoulder 48 male member 36. If a screw driver is used, it may be inserted into the gap 79 (FIG. 2B) between the closed end of the clip 72 and the female member. Alternatively, the gap 79 facilitates gripping of the closed end 72 of the clip with a pair of pliers or other tool. Once the spring clip is removed, the male member may be easily removed from the bore of the female member.

The present invention therefore offers a connector that permits ease of joining and securing the male and female members together. A reliable connection system that meets the applicable Society of Automotive Engineers (SAE) test standards is also provided. In addition, the male and female members may be easily separated once the connector spring clip is removed using standard tools, such as a screwdriver or pliers. No special tools are required.

Another advantage of the connector of the present invention is that the male member from an existing connector may be used, and only the female member of the existing connector replaced with the female member of the connector of the invention. As a result, older hydraulic clutch systems may be easily retrofitted with the connector of the present invention.

While the preferred embodiments of the invention have been shown and described, it will be apparent to those skilled in the art that changes and modifications may be made therein without departing from the spirit of the invention, the scope of which is defined by the appended claims.

What is claimed is:

1. A method of fastening a male member of a hydraulic line connector to a female member of the hydraulic line connector comprising the steps of:
   a) providing a female member with a body portion having a body passage adapted to be connected to a first hydraulic component, the female member also having a cylindrical wall portion extending from the body portion and defining a bore which is in selective fluid communication with the body passage via an opening, the bore including a frusto-conical surface surrounding the opening and adapted to engage an O-ring of a male member positioned within the bore, the female member having an opposing pair of spaced apart first and second curved slits formed through the cylindrical wall portion, the first slit having a first pair of opposing end portions and a first pair of opposing walls, and the second slit having a second pair of opposing end portions and a second pair of opposing walls;
   b) providing a spring clip having a first leg defining a first arcuate portion and a first angled end, a second leg defining a second arcuate portion and a second angled end and a closed end portion positioned between and attached to the first and second legs, the first and second arcuate portions being formed as opposed circular segments which curve outwardly from opposite ends of the closed end portion and being located centrally between the opposite ends of the closed end portions and the first and second angled ends such that the circular segments are diametrically opposed to one another, the spring clip having a width which is greater than a thickness of the spring clip;
   c) removably positioning the first and second legs of the spring clip, one each in the first and second curved slits of the female member such that the first and second angled ends extend radially outwardly away from the cylindrical wall portion of the female member, the closed end portion extends between the first and second curved slits with at least part of the closed end portion engaging the opposing end portions of the first and second curved slits, and the circular segments of the spring clip are diametrically opposed and concentric with a longitudinal axis of the female member and transverse to central portions of the first and second curved slits;
   d) providing the male member having a passage adapted to be connected to a second hydraulic component and to the bore and the body passage of the female member, the male member having a constant diameter sliding surface bordered on one end by a circumferential flange and formed with a shoulder on an end opposite the circumferential flange, the male member also having a sleeve slidably mounted on the sliding surface and provided with a circumferential collar, the sleeve being slidable between the shoulder and the circumferential flange, the male member further having a reduced portion which has a nose formed with an opening in communication with the passage in the male member, the reduced portion carrying an O-ring thereon; and
   e) positioning the male member in the bore of the female member such that the sliding sleeve engages an interior surface of the cylindrical wall portion of the female member causing the circumferential collar of the sliding sleeve to contact the circumferential flange and expose a portion of the sliding surface of the male member adjacent the shoulder, which exposed portion is aligned with the first and second curved slits, the circumferential flange being configured to force the sliding sleeve to wedge between the sliding surface and the interior surface of the cylindrical wall portion, resulting in the frusto-conical surface of the male member forcing the first and second legs of the spring clip apart so that edges of the circular segments of the spring clip abut and engage the shoulder on diametrically opposite sides of the male member, and inner concave surfaces of the circular segments circumferentially and matingly engage and partially surround the exposed portion of the sliding surface between the opposing end portions of the first and second curved slits.

2. The method of claim 1, wherein the female member includes an abutment surface and a coil spring positioned within the body passage so as to urge the abutment surface into a position where the opening of the female member is closed.

3. The method of claim 2, wherein the abutment surface is an annular abutment that surrounds an enlarged head that is attached to the body portion of the female member.

4. The method of claim 3, wherein the enlarged head is attached to the body portion of the female member by a rod positioned within the body passage of the female member.

5. The method of claim 1, wherein a gap is formed between the exterior surface of the cylindrical wall portion of the female member and the closed end portion of the spring clip when the male member is removably received within the bore of the female member and the spring clip is removably received within the first and second curved slits of the cylindrical wall portion of the female member and further comprising the steps of:
   f) engaging the closed end portion of the spring clip with a tool;
   g) removing the first and second legs of the spring clip from engagement with the first and second curved slits of the female member with the tool; and
   h) removing the male member from the bore of the female member.

6. The method of claim 1, wherein the nose of the male member includes a cylindrical stopper urged into a closed position in the opening of the nose by a coil spring.

7. The method of claim 1, wherein the closed end portion of the spring clip engages an exterior surface of the cylindrical wall portion of the female member.

* * * * *